United States Patent
Sinn et al.

(10) Patent No.: US 10,095,219 B2
(45) Date of Patent: *Oct. 9, 2018

(54) NUMERICAL CONTROL UNIT WITH THE OPTION OF MODIFYING THE SUB-PROGRAM

(71) Applicant: SIEMENS AKTIENGESELLSCHAFT, München (DE)

(72) Inventors: Christof Sinn, Vaihingen (DE); Ralf Spielmann, Stuttgart (DE)

(73) Assignee: Siemens Aktiengesellschaft, München (DE)

( * ) Notice: Subject to any disclaimer, the term of this patent is extended or adjusted under 35 U.S.C. 154(b) by 194 days.

This patent is subject to a terminal disclaimer.

(21) Appl. No.: 14/786,825

(22) PCT Filed: Aug. 27, 2013

(86) PCT No.: PCT/EP2013/067662
§ 371 (c)(1),
(2) Date: Oct. 23, 2015

(87) PCT Pub. No.: WO2014/173469
PCT Pub. Date: Oct. 30, 2014

(65) Prior Publication Data
US 2016/0103447 A1    Apr. 14, 2016

(30) Foreign Application Priority Data
Apr. 25, 2013    (EP) ..................................... 13165313

(51) Int. Cl.
*G05B 19/4155* (2006.01)
*G05B 19/4068* (2006.01)

(52) U.S. Cl.
CPC ..... *G05B 19/4155* (2013.01); *G05B 19/4068* (2013.01); *G05B 2219/32128* (2013.01);
(Continued)

(58) Field of Classification Search
CPC ........................ G05B 19/4155; G05B 19/4068
See application file for complete search history.

(56) References Cited

U.S. PATENT DOCUMENTS 6,112,133 A * 8/2000 Fishman .......... G05B 19/40937
700/180
6,263,322 B1 * 7/2001 Kirkevold .......... G06Q 30/0283
705/400

(Continued)

FOREIGN PATENT DOCUMENTS

CN    1740932 A    3/2006
CN    101702087 A    5/2010
(Continued)

*Primary Examiner* — Mohammad Ali
*Assistant Examiner* — Vincent Chang
(74) *Attorney, Agent, or Firm* — Henry M. Feiereisen LLC

(57) ABSTRACT

A sub-program carried out by a numerical control unit that controls a production machine is disclosed. The numerical control unit transmits a piece of information identifying a program instruction, by means of which the sub-program was generated to a CAM system after the instruction is selected by a user through an operator interface. The numerical control unit receives, a parameterized description of the sequence of program instructions containing the selected program instruction from the CAM system. The numerical control unit outputs the parameterized description to the user via the operator interface and receives a modification of the parameterized description from the user. The numerical control unit then transmits the modified parameterized description to the CAM system and receives a modified (Continued)

sub-program corresponding to the modified parameterized description from the CAM system.

9 Claims, 3 Drawing Sheets

(52) U.S. Cl.
CPC ............. *G05B 2219/36088* (2013.01); *G05B 2219/36094* (2013.01)

(56) References Cited

U.S. PATENT DOCUMENTS

| | | | |
|---|---|---|---|
| 6,338,003 B1 * | 1/2002 | Kamiguchi | G05B 19/409 700/169 |
| 6,879,874 B2 | 4/2005 | Sinn | |
| 6,901,310 B2 | 5/2005 | Kobbelt et al. | |
| 6,956,567 B2 | 10/2005 | Sinn | |
| 6,961,056 B2 | 11/2005 | Sinn | |
| 7,149,668 B2 | 12/2006 | Schwanecke et al. | |
| 2005/0113962 A1 * | 5/2005 | Matthews | G05B 19/4097 700/182 |

FOREIGN PATENT DOCUMENTS

| | | |
|---|---|---|
| DE | 102005025338 A1 | 12/2006 |
| EP | 2541355 A1 | 1/2013 |
| JP | H03-294906 A | 12/1991 |
| JP | H04-159057 A | 6/1992 |
| JP | H04-295903 A | 10/1992 |
| JP | H05-189025 A | 7/1993 |
| JP | H05-241637 A | 9/1993 |
| JP | H07-24690 A | 1/1995 |
| JP | H10-320027 A | 12/1998 |
| WO | WO 03056401 A1 | 7/2003 |

* cited by examiner

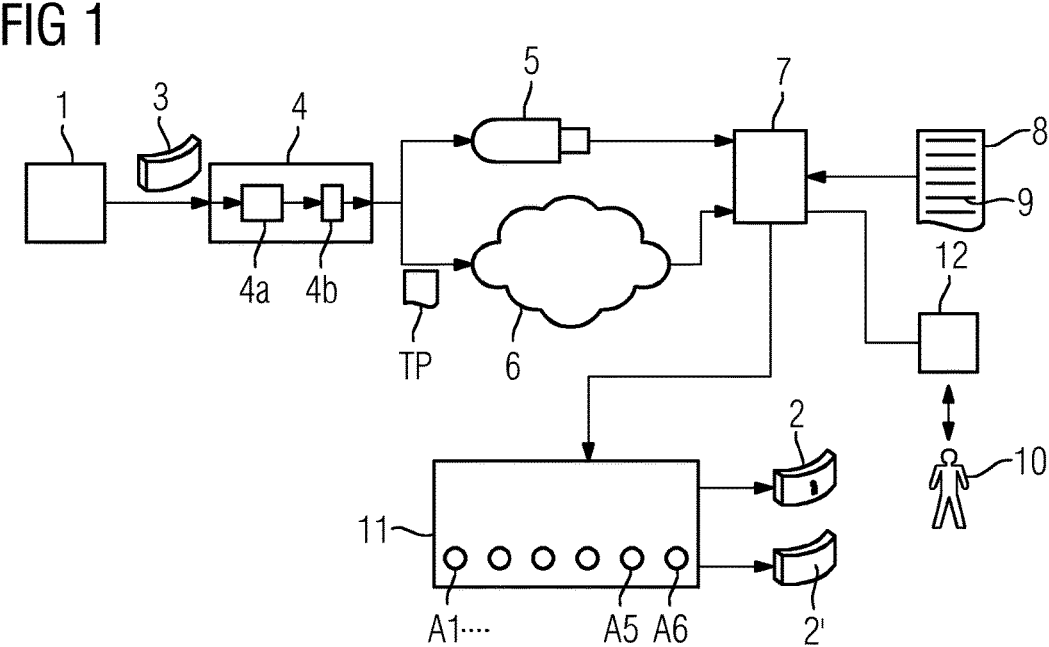
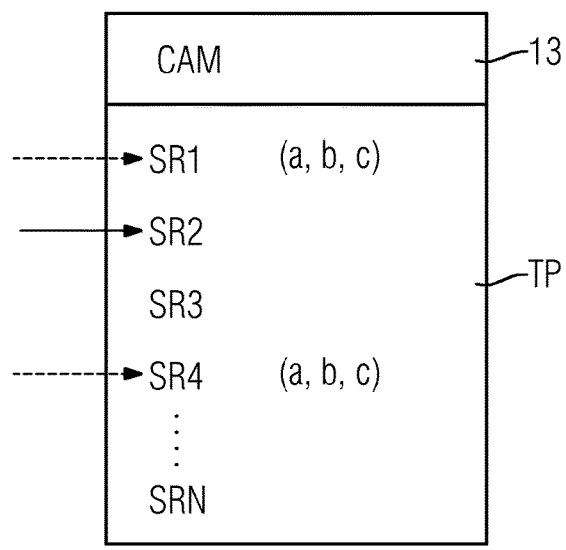

NUMERICAL CONTROL UNIT WITH THE OPTION OF MODIFYING THE SUB-PROGRAM

CROSS-REFERENCES TO RELATED APPLICATIONS

This application is the U.S. National Stage of International Application No. PCT/EP2013/067662, filed Aug. 27, 2013, which designated the United States and has been published as International Publication No. WO 2014/173469 A1 and which claims the priority of European Patent Application, Serial No. 13165313.1, filed Apr. 25, 2013, pursuant to 35 U.S.C. 119(a)-(d).

BACKGROUND OF THE INVENTION

The present invention relates to an operating method for a numerical control unit,
wherein the numerical control unit has access to a sub-program which can be executed by the numerical control unit,
wherein a production machine can be controlled by the numerical control unit by executing the sub-program,
wherein a selection command is predetermined to the numerical control unit by a user by way of a user interface, by means of which at least one program instruction of a sequence of program instructions of the sub-program is selected.

The present invention further relates to a computer program, wherein the computer program comprises machine code which can be immediately executed by a numerical control unit, wherein the machine code is executed by the numerical control unit such that the numerical control unit executes an operating method of this type.

The present invention further relates to a numerical control unit, in which a computer program of this type which can be executed by the numerical control unit is stored.

Numerical control units usually implement a so-called sub-program during operation. The sub-program defines the manner in which position and speed-controlled axes of the production machines (in particular a machine tool) are controlled. Theoretically it is possible to generate the sub-programs directly by way of the user interface of the numerical control unit. The user interface of the numerical control unit nevertheless only makes available the option of setting control commands individually sequentially. In practice the sub-program is therefore generated by means of a CAM system based on data generated by means of a CAD system. The CAM system may comprise a so-called post-processor.

When the sub-program is generated, a series of sequences of program instructions is generated by a user of the CAM system by means of the CAM system. For each sequence of program instructions, the user of the CAM system specifies to the CAM system a parameterized description of the respective processing. For instance, during milling in mold and die production, the user of the CAM system can predetermine for a finishing operation which tool is to be used, how great a feed depth is to be, what the geometry relationship is and such like. He can also predetermine a path along which a miller is to be moved for instance. On the basis of the parameterized descriptions of the sequences of program instructions, the CAM system then generates the sub-program. The sub-program is transferred to the numerical control unit. It generally no longer contains the parameterized descriptions as such, but instead only the sequence of individual control commands for the position and speed-controlled axes of the production machine. The sequence of the individual control commands may be very long (sometimes several millions of data records). The criteria which form the basis of the determination of the sequence of control commands can no longer be inferred from the sequence of control commands. Examples of such criteria are the line pitch, the tool geometry, the processing strategy, effects of collision prevention calculations, technological values like for instance the situation of the tool etc.

If the sub-program is to be modified, a direct change in the control commands does not as such represent a practicable method, since the criteria forming the basis of the series of control commands can no longer be inferred from the sequence of control commands. Instead, the parameterized descriptions which form the basis of the sequences of program instructions can be changed.

The user of the CAM system is generally a different person from the user of the numerical control unit. In many cases, the user of the CAM system is lacking the technical specifications of the production machine which are to be controlled by means of the sub-program. This may result in the execution of the sub-program by the numerical control unit not resulting in correctly manufactured workpieces. As the ease may be, it may be necessary in cases of this type to fundamentally determine the sub-program again. In many cases, on account of his knowledge of the production machine and its technical specifications it is however apparent to the user of the numerical control unit which technological parameter of which parameterized description has to be changed in order to be able to manufacture a correct workpiece.

Within the prior art, the user of the numerical control unit can only then implement changes to the sub-program if the part of the sub-program to be changed is present in parameterized form in the numerical control unit. This is generally only the case in a small fraction of the overall sub-program. In all other cases, the user of the numerical control unit must communicate with the user of the CAM system and inform the same which parameters in which parameterized description he would have liked to have changed. The user of the CAM system thereupon calls up the CAM system, manually changes the correspondingly parameterized description and then recreates the sub-program. The correspondingly modified sub-program is transferred to the numerical control unit generally as a replacement of the original sub-program.

It may be that the modified sub-program also does not result in the desired result. In a case of this type, the last mentioned procedure, repeatedly in some instances, must be repeated until the workpiece manufactured by means of the sub-program is correct.

The object of the present invention consists in creating possibilities, by means of which the user of the numerical control unit can himself change the CAM-generated sub-program.

SUMMERY OF THE INVENTION

The object is achieved in accordance with the invention by an operating method in which
the numerical control unit has access to a sub-program which can be executed by the numerical control unit,
a production machine can be controlled by the numerical control unit by executing the sub-program,
a selection command is predetermined to the numerical control unit by a user by way of a user interface, by means of which at least one program instruction of a sequence of program instructions of the sub-program is selected, the numerical control unit transmits an item of information identifying the at least one selected program instruction via a computer-computer connection directly or indirectly to a CAM system, by means of which the sub-program was generated, the numerical control unit receives a parameterized description of the sequence of program instructions containing the at least one selected program instruction by way of the computer-computer connection from the CAM system, the numerical control unit outputs the parameterized description by way of the user interface to the user of the numerical control unit, the numerical control unit receives a change in the parameterized description from the user, the numerical control unit transmits the modified parameterized description to the CAM system and the numerical control unit receives a modified sub-program which corresponds to the modified parameterized description from the CAM system.

Advantageous embodiments of the inventive operating method form the subject matter of the dependent claims.

As a result, it is possible for the user of the numerical control unit to obtain a parameterized description of precisely that part of the sub-program which he would like to change.

In a preferred embodiment of the inventive operating method, provision is made that, the numerical control unit receives from the CAM system, together with the parameterized description, an image of a processing of a workpiece effected by executing the sub-program, said image corresponding to the parameterized description, and the numerical control unit outputs the image via the user interface to the user.

As a result, a graphical representation of the associated processing is also available to the user in addition to the parameterized description as such.

Provision is preferably made for, the numerical control unit, after transmitting the modified parameterized description, to first receive from the CAM system an image of a processing of a workpiece effected by executing the modified sub-program, said image corresponding to the changed parameterized description, the numerical control unit to output the image via the user interface to the user, and the numerical control unit to firstly request the modified sub-program from the CAM system, once it has received a confirmation of the image as correct from the user.

The extent of the data quantities to be transmitted can be minimized by means of this procedure.

The inventive procedure can be executed irrespective of which program instruction the user selects. It can then also be executed if the user of the numerical control unit selects a program instruction of a sequence of program instructions which is stored in parameterized form in the numerical control unit. The inventive procedure nevertheless indicates its full strength in the event that the sequence of program instructions is not present in parameterized form in either the sub-program or in the numerical control unit.

It is possible that only certain program instructions or certain groups of consecutive program instructions can be selected by the user. However, any program instruction or any group of consecutive program instructions of the sequence of program instructions can preferably be selected by the user.

The program instructions selected by the user can comprise in particular at least one program instruction, on the basis of which the workpiece is processed on a surface which is curved in two respectively orthogonal directions at at least one point in the surface.

In practice, a main program of the sub-program often comprises subprogram calls. The associated subprograms can alternatively be parameterized program instructions or free form processings. The selection by the user of the numerical control unit can be configured such that the user selects the at least one program instruction by selecting one of the subprogram calls.

For a correct functioning of the inventive operating method, it is necessary for the CAM system, by means of which the sub-program was generated, to be known to the numerical control unit. It is possible for this information to be permanently stored in the numerical control unit or for the corresponding information to be requested by the user of the CAM system. The numerical control unit preferably however determines the corresponding CAM system automatically with the aid of a header of the sub-program.

The object is further achieved in accordance with the invention by a computer program which is configured such that the machine code is executed by the numerical control unit such that the numerical control unit executes an inventive operating method.

The object is further achieved by a numerical control unit, in which an inventive computer program which can be executed by the numerical control unit is stored.

BRIEF DESCRIPTION OF THE DRAWINGS

The afore-described properties, features and advantages of this invention and the manner in which they are achieved will become clearer and more understandable in conjunction with the following description of the exemplary embodiments, which are explained in more detail in conjunction with the drawings, in which, shown schematically;

FIG. 1 shows a combination of a number of facilities,

FIG. 2 shows a main program of a sub-program,

Figure 3:
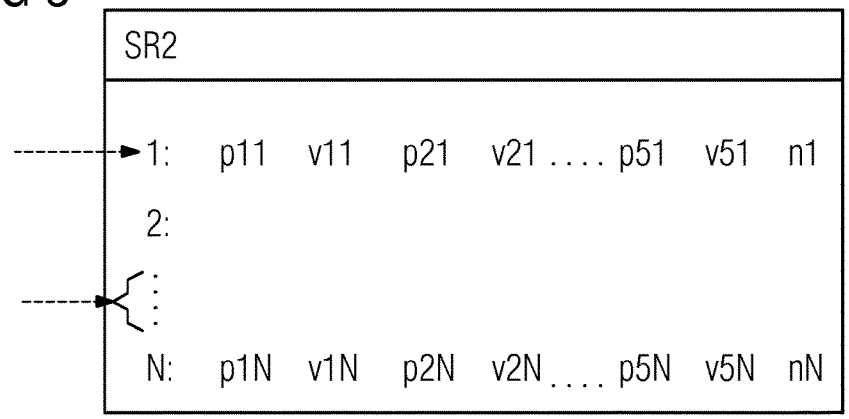
FIG. 3 shows a subprogram of a sub-program.

The typical procedure of the prior art upon which the present invention is based is firstly explained below in conjunction with FIG. 1.

DETAILED DESCRIPTION OF A PREFERRED EMBODIMENT

According to FIG. 1, a workpiece 2 to be manufactured is firstly specified by means of a CAD system 1. A (generally purely geometrical) description 3 of the workpiece 2 is forwarded to a CAM system 4. The CAM system 4 generally comprises a CAM processor 4*a* and a postprocessor 4*b*. A sub-program TP is generated by means of the CAM system 4. The CAM processor 4*a* is responsible for a process pattern. The CAM processor 4*a* generally generates a sequence of tool paths on the basis of parameterized masks which are assigned to surfaces of the workpiece 2. The tool paths are generally still defined in a control-unit-neutral manner. The post-processor 4b converts the tool paths into a control-unit-specific sequence (=the sub-program TP). The sub-program TP is transmitted to a numerical control unit 7 by way for instance of a data carrier 5 or a computer-computer connection 6. The numerical control unit 7 as a result has access to the sub-program TP. The representation of the data carrier 5 as a USB memory stick is purely exemplary. The computer-computer connection 6 can, depending on the position of the individual case, be embodied as a LAN, as a WAN or as a WWW. Direct access of the numerical control unit 7 to the sub-program TP of the CAM system 4 can in some instances be possible by way of the computer-computer connection 6.

The numerical control unit 7 is programmed with a computer program 8. The computer program 8 is stored internally in the numerical control unit 7, for instance in an EEPROM or in a Flash EEPROM. The computer program 8 comprises machine code 9, which can be executed directly by the numerical control unit 7. The computer program 8 is generally stored by the manufacturer of the numerical control unit 7 in the numerical control unit 7.

Execution of the machine code 9 by the numerical control unit 7 firstly means that the numerical control unit 7, after predetermining a corresponding control command by means of a user 10, executes the sub-program TP. By executing the sub-program TP, a production machine 11 is controlled by the numerical control unit 7. The production machine 11 can in particular be embodied as a machine tool. The workpiece 2 is produced by executing the sub-program TP (and the corresponding control unit of the production machine 11).

A main program of the sub-program TP generally comprises according to FIG. 2 subprogram calls SR1, SR2, ... SRN. It may even consist exclusively of a sequence of subprogram calls SR1, SR2, ... SRN.

Some of the subprogram calls SR1, SR2, ... SRN—according to FIG. 2 the subprogram calls SR1 and SR4—are parameterized. In such a case, the associated subprogram is stored in the numerical control unit 7 as a function of the sub-program TP. By means of the associated subprogram, the corresponding subprogram call SR1, SR4 is converted into a sequence of individual movements of position-controlled axes A1 to A5 of the production machine 11 within the numerical control unit 7. The numerical control unit 7 takes into account the parameters a, b, c of the corresponding subprogram call SR1, SR4 during conversion into the movements of the position-controlled axes A1, to A5. These parts of the sub-program TP can therefore be predetermined to the numerical control unit 7 in parameterized form.

Other subprogram calls SR1, SR2, ... SRN, according to FIG. 2 the subprogram calls SR2 and SR3, are not parameterized. In this case, the associated subprograms form an integral part of the sub-program TP. In accordance with FIG. 3, they generally consist of a (very long) sequence of individual movements of the position-controlled axes A1 to A5. For each individual movement, a respective position value p11 to p51, p1N to p5N is predetermined for each position-controlled axis A1 to A5. Moreover, a respective speed value v11 to v51, v1N to v5N can be predetermined for each position-controlled axis A1 to A5. Often however fewer overlapping speeds are predetermined, sometimes even only a single speed, on the basis of which the numerical control unit 7 automatically determines the speed values of the axes A1 to A5 for the respective position p11 to p51, p1N to p5N. Moreover, a speed n1 to nN is in most instances predetermined for at least one speed-controlled axis A6.

It is possible for the non-parameterized subprogram calls SR2, SR3 to be omitted as such and instead the sequence of individual movements of the position-controlled axes A1 to A5 and if necessary also the speeds n1 to nN of the speed-controlled axis A6 to be contained in the main program of the sub-program TP.

The computer program 8, with which the numerical control unit 7 is programmed, means by way of executing the sub-program TP that the user 10 can communicate with the numerical control unit 7 by way of a user interface 12, and the numerical control unit 7 executes activities based hereupon. The corresponding operating method, which is the subject matter of the present invention, is explained in more detail below in conjunction with FIG. 4.

Figure 4:
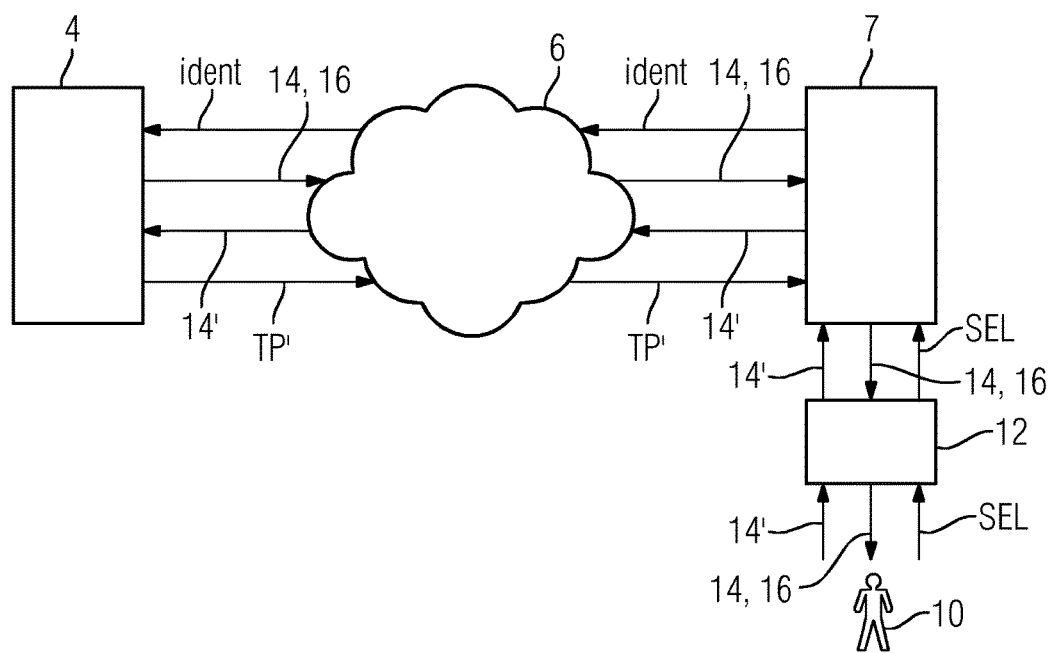
FIG. 4 shows a communication of the combination in FIG. 1.

According to FIG. 4, the user 10 of the numerical control unit 7 can predetermine a selection command SEL by way of the user interface 12. At least one program instruction of a sequence of program instructions of the sub-program TP is selected by means of the selection command SEL. For instance, the user 10, as indicated by the dashed arrows in FIG. 2, can select a subprogram call SR1, SR4, which is predetermined to the numerical control unit 7 in parameterized form, the associated sub-program of which is therefore stored in the numerical control unit 7 independently of the sub-program TP. Alternatively, the user 10, as indicated in FIG. 3 by the dashed arrows, can select an individual program instruction of a sequence of program instructions or a group of consecutive program instructions of the sequence of program instructions by means of the selection command SEL. For instance, the user 10, in the last-mentioned instance, can select the first and the last program instruction of the group to be selected. The associated sequence of program instructions is preferably not in parameterized form in either the sub-program TP or in the numerical control unit 7. In turn, the user 10, as indicated in FIG. 2 by a continuous arrow, can alternatively select a subprogram call SR2 by means of the selection command SEL, said subprogram call SR2 not being in parameterized form in the numerical control unit 7 or in the subprogram TP. In this case, the entire sequence of movements of the corresponding subprogram is selected by the selection command SEL (indirectly).

It is possible for the operating method explained in further detail below to only then be executed if the user 10 selects certain program instructions. The operating method explained further below is preferably always executed, in other words independently of the program instruction or program instructions which the user 10 selects. The user 10 can therefore, provided it relates to the inventive operating method, preferably select any program instruction or any group of consecutive program instructions in the sequence of program instructions. In particular, the program instructions selected by the user 10 can comprise at least one program instruction, on the basis of which the workpiece 2 is processed on a surface which is curved in two respectively orthogonal directions at at least one point of the surface. This applies irrespective of how the two respectively orthogonal directions are selected. In other words, there is no direction on the corresponding point of the surface in which the surface is not curved.

The numerical control unit 7 knows the CAM system 4 by means of which the subprogram TP was generated. For instance, a corresponding piece of information can be predetermined to the numerical control unit 7 by the user 10. The corresponding information can also be permanently stored in the numerical control unit 7. The sub-program TP according to FIG. 2 preferably however contains a header 13 in which the corresponding information is stored. In this case, the numerical control unit 7 can automatically determine the associated CAM system 4 with the aid of the header 13. The information as such can be of any type. For instance, it can be stored in the form of a URL (universal resource locator).

On account of the selection command SEL, the numerical control unit 7 according to FIG. 4 transmits an information ident to the CAM system 4 directly or indirectly by way of the computer-computer connection 6. The identification ident identifies the at least one selected program instruction. For instance, the corresponding information ident can comprise the line number of the main program of the sub-program TP or an identifier of the corresponding subprogram and there the line number.

Figure 5:
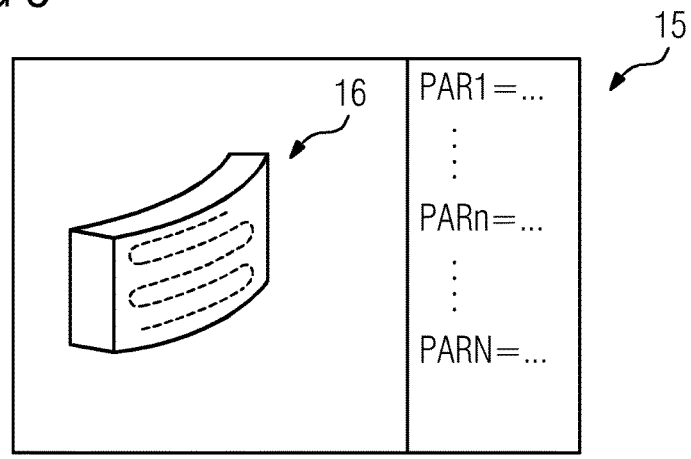
FIG. 5 shows an output mask.

The information ident is automatically processed by the CAM system 4. In particular, the CAM system 4 determines the associated parameterized description 14 of the sequence of program instructions containing the at least one selected program instruction. The parameterized description 14 transmits the CAM system 4 via the computer-computer connection 6 to the numerical control unit 7. The numerical control unit 7 receives the parameterized description 14. Moreover, the numerical control unit 7 outputs the parameterized description 14 via the user interface 12 to the user 10. FIG. 5 shows the corresponding representation in an output mask 15.

The parameterized description 14 contains a number of parameters PAR1 to PARN. The parameters PAR1 to PARN can be changed by the user 10. If the user 10 now changes one of the parameters PAR1 to PARN, for instance the parameter PARn, the numerical control unit 7 counteracts the modification. It transmits (after predetermining a corresponding request by the user 10) the modified parameterized description 14' or at least the modifications, for instance the changed parameters PARn (or all parameters PAR1 to PARN including the changed parameter PARn), via the computer-computer connection 6 to the CAM system 4. The CAM system 4 determines thereupon a modified sub-program TP'. The modified sub-program TP' corresponds to the parameterized description 14' modified by the user 10. The modified sub-program TP' is automatically transmitted to the numerical control unit 7 by the CAM system 4. The numerical control unit 7 receives the modified sub-program TP'. The user 10 is able to call up the modified sub-program TP' instead of the original sub-program TP and to allow the same to be executed by the numerical control unit 7.

The afore-cited basic principle of the present invention can be modified in a variety of ways.

It is possible for instance that the CAM system 4, together with the parameterized description 14, transmits an image 16 to the numerical control unit 7. The image 16 corresponds to a processing of the workpiece 2 which is effected by executing the sub-program TP. In particular, the image 16 indicates the processing process as such, for instance the path passed by a processing tool or other parameters such as for instance a pitch. The image 16 is realistic in the sense that shown measures and angles are true to life. The numerical control unit 7 receives the image 16 and outputs the same via the user interface 12 to the user 10 (see FIG. 5).

Figure 6:
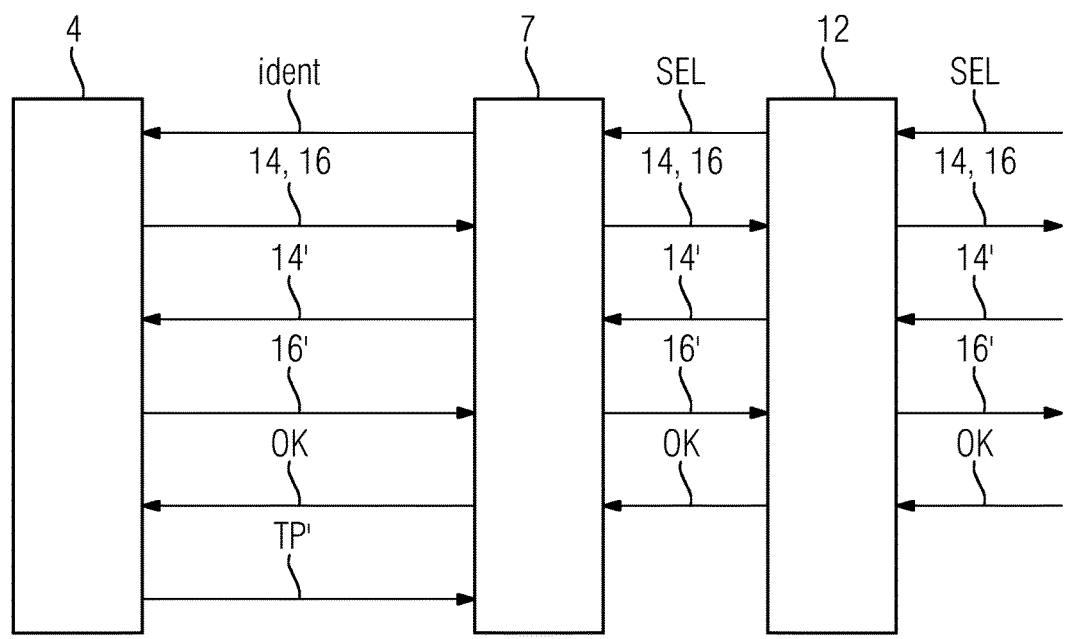
FIG. 6 shows a further communication of the combination in FIG. 1.

Moreover, the user 10 is at least optionally given the option of not immediately requesting the modified sub-program TP', but instead firstly performing a type of preview. In this case, the numerical control unit 7 according to FIG. 6, as before, transmits the modified parameterized description 14' to the CAM system 4. The CAM system 4 thereupon determines however firstly an image 16'. The image 16' indicates, similarly to the image 16, a processing of a workpiece 2' which is true to life. The image 16' is however based on the modified sub-program TP'. It therefore corresponds to the modified parameterized description. Incidentally, it corresponds to the image 16. The image 16' is transmitted from the CAM system to the numerical control unit 7, which receives the same and outputs it via the user interface 12 to the user 10. The modified sub-program TP' by contrast is still not transferred to the numerical control unit 7 at this point in time. The modified sub-program TP' is firstly then requested by the numerical control unit 7 from the CAM system 4, if the numerical control unit 7 has accepted a confirmation OK of the image 16' and thus also the modified parameterized description 14' as correct from the user 10.

The present invention has many advantages. In particular, it is easily possible for the user 10 of the numerical control unit 7 (or the production machine 11) to modify a sub-program TP if required, if problems result on site during the manufacture of the workpiece 2

Although the invention was illustrated and described in detail by the preferred exemplary embodiment, the invention is thus not restricted by the disclosed examples and other variations can be derived herefrom by the person skilled in the art without departing from the scope of protection of the invention.

What is claimed is:

1. An operating method modifying the operation of a numerical control unit that is configured to control a production machine by executing a machine-readable sub-program having instructions configured by a CAM system, said sub-program being stored in memory accessible to the numerical control unit, said numerical control unit having an operator interface having a display unit, said method comprising the steps of:

entering a command into the numerical control unit, said command selecting at least one program instruction in a sequence of program instructions in the sub-program using the operator interface;

conveying an item of information identifying the at least one selected program instruction in the sequence of program instructions directly or indirectly from the numerical control unit to the CAM system that generated the sub-program using a computer-to-computer connection;

conveying a parameterized description of the sequence of program instructions containing the at least one selected program instruction provided by the CAM system to the numerical control unit using a computer-to-computer connection;

displaying an image of a workpiece provided by executing the sub-program together with the sequence of program instructions corresponding to the parameterized description transmitted from the CAM system on the display unit and storing the result in a memory accessible to the display unit, said image corresponding to the parameterized description of the sequence of program instructions transmitted from the CAM system;

inputting a change in said parameterized description to the numerical control unit using the operator interface;

transmitting the modified parameterized description identifying the modified sequence of program instructions from the numerical control unit to the CAM system; and entering a modified sub-program configured by the CAM system that provides processing of a workpiece by the production machine in accordance with the modified parameterized description transmitted to the CAM system in memory accessible to the numerical control unit.

2. The operating method of claim 1, further comprising:
entering an image of processing of a workpiece by executing the modified sub-program together with the modified parameterized description into memory accessible to the numerical control unit, said image corresponding to the modified parameterized description, after transmitting the modified parameterized description from the CAM system to the numerical control unit;
outputting the image from the numerical control unit using the operator interface;
confirming that the image is correct using the operator interface of the numerical control unit; and
requesting the modified sub-program from the CAM system for numerical control unit, once the image has been confirmed as correct.

3. The operating method of claim 1, wherein the sequence of program instructions is present in parameterized form either in the stored sub-program or in the numerical control unit.

4. The operating method of claim 1, wherein any program instruction or any group of consecutive program instructions of the sequence of program instructions can be selected by the user.

5. The operating method of claim 1, wherein the program instructions selected by the user comprise at least one program instruction by which the workpiece is processed on a surface that is curved in two directions at least at one point on the surface, the two directions being respectively orthogonal to each other.

6. The operating method of claim 1 wherein a main program of said sub-program includes sub-program calls, further comprising selecting the at least one program instruction by selecting a subprogram call using the operator interface.

7. The operating method of claim 1, further comprising automatically determining what CAM system generated the sub-program, the numerical control unit using a header of the sub-program for this determination.

8. A computer program embodied in a non-transitory computer readable medium, wherein the computer program is fixed in a machine-readable code and configured for execution by a numerical control unit to modify a sub-program configured to be executed by the numerical control unit to control a production machine, said numerical control unit having an operator interface having a display unit, the computer program comprising:
machine-readable code that selects at least one program instruction of a sequence of program instructions in the sub-program in response to a command entered into the numerical control unit using the operator interface;
machine-readable code that provides an item of information identifying the at least one selected program instruction in the sequence of program instructions directly or indirectly from the numerical control unit to the CAM system that generated the sub-program using a computer to computer connection;
machine-readable code receiving a parameterized description of the sequence of program instructions containing the at least one selected program instruction from the computer-computer connection between the CAM system and the numerical control unit, and displaying an image of a workpiece provided by executing the sub-program together with the sequence of program instructions corresponding to the parameterized description transmitted from the CAM system on the display unit and storing the result in a memory accessible to the display unit, said image corresponding to the parameterized description of the sequence of program instructions transmitted from the CAM system;
machine-readable code entering a change in said parameterized description into the numerical control unit received from the operator interface;
machine-readable code transmitting the modified parameterized description from the numerical control unit to the CAM system; and
machine-readable code entering a modified sub-program from the CAM system that provides processing of a workpiece by the production machine in accordance with the modified parameterized description transmitted to the CAM system, into memory accessible to the numerical control unit.

9. A numerical control unit configured to control a production machine by executing a machine-readable sub-program having instructions configured by a CAM system, said numerical control unit comprising:
an operator interface having a display unit;
a computer processor configured to execute a computer program loaded into memory accessible to the numerical control unit, the computer program including a sub-program executable by the numerical control unit to control the production machine, said sub-program including:
machine-readable code that selects at least one program instruction of a sequence of program instructions in the sub-program in response to a selection entered into the numerical control unit using the operator interface,
machine-readable code that provides an item of information identifying the at least one selected program instruction directly or indirectly from the numerical control unit to a CAM system that generated the sub-program using a computer-computer connection;
machine-readable code receiving a parameterized description of the sequence of program instructions containing the at least one selected program instruction from the computer-computer connection between the CAM system and the numerical control unit and displaying an image of a workpiece provided by executing the sub-program together with the sequence of program instructions corresponding to the parameterized description transmitted from the CAM system on the display unit and storing the result in a memory accessible to the display unit, said image corresponding to the parameterized description of the sequence of program instructions transmitted from the CAM system;
machine-readable code entering a change in said parameterized description that the numerical control unit received from the operator interface;
machine-readable code transmitting the modified parameterized description identifying the sequence of program instructions from the numerical control unit to the CAM system; and
machine-readable code receiving a modified sub-program from the CAM system that provides processing of the workpiece by the production machine in accordance with the modified parameterized description transmitted to the CAM system into memory accessible to the numerical control unit.

* * * * *